United States Patent [19]

Upp

[11] Patent Number: 4,608,684

[45] Date of Patent: Aug. 26, 1986

[54] DIGITAL SWITCHING SYSTEMS EMPLOYING MULTI-CHANNEL FRAME ASSOCIATION APPARATUS

[75] Inventor: Daniel C. Upp, Southbury, Conn.

[73] Assignee: ITT Corporation, New York, N.Y.

[21] Appl. No.: 593,342

[22] Filed: Mar. 26, 1984

[51] Int. Cl.$^4$ ............................................. H04Q 11/04
[52] U.S. Cl. ........................................ 370/58; 370/118
[58] Field of Search ...................... 370/58, 60, 94, 118; 375/38

[56] References Cited

U.S. PATENT DOCUMENTS

| | | | |
|---|---|---|---|
| 4,453,247 | 6/1984 | Suzuki et al. | 370/60 |
| 4,538,259 | 8/1985 | Moore | 370/60 |
| 4,543,652 | 9/1985 | Amada et al. | 370/58 |

*Primary Examiner*—Douglas W. Olms
*Attorney, Agent, or Firm*—Peter C. Van Der Sluys

[57] ABSTRACT

There is disclosed an apparatus for enabling one to increase the bandwidth of a multi-channel digital switching system. Essentially, the system allows one to set up multi-channel link paths to obtain a total band width of N times the bandwidth of a typical switching path in a digital switching network. To do this, a common frame counter is located in the unused bit positions of the sample in each of the paths, forming a wideband channel. At the receive end, the apparatus de-skews the received samples to properly reassembly the output. This operation is provided by utilizing one content addressable memory and an associated random access memory (CAM/RAM) (C/R) for each channel to be joined. The width of each C/R is twelve bits, eight for data, the read-out section and four for frame counter, which is the associative section. The length of each C/R is a function of the maximum skew to be counted. A four bit output frame counter provides the associative addresses for the C/R which, when given an associative address corresponding to a frame number, will respond with an eight bit data word for that frame or with an Empty signal, meaning that no word exists for that frame number. At initialization the frame counter presets to one and all C/Rs are interrogated to see if they contain frame one information. If they do not, then the output frame counter is indexed and all C/Rs are re-interrogated at a fast rate until they all indicate not Empty. At this point, the outputs of each C/R for the frame count indicated are assembled into an output word. Thus as long as all the C/Rs indicate not Empty, frame integrity is insured, and hence the distributed control switching system can provide wideband operation via multi-channel linked paths while insuring frame integrity.

27 Claims, 16 Drawing Figures

SWITCH WORD FORMATS

| | F | E | D | C | B | A | 9 | 8 | 7 | 6 | 5 | 4 | 3 | 2 | 1 | 0 | |
|---|---|---|---|---|---|---|---|---|---|---|---|---|---|---|---|---|---|
| IDLE | | | | | | | | | | | | | | 0 | 0 | | |
| SELECT | | | | | | | | | | | | | | 0 | 1 | | |
| ESCAPE | | | | | | | | | | | | | | 1 | 0 | | |
| SPATA | | | | | | | | | | | | | | 1 | 1 | | |
| | 1 | X | $D_7$ | $D_6$ | $D_5$ | $D_4$ | $D_3$ | $D_2$ | $D_1$ | $D_0$ | $T_3$ | $T_2$ | $T_1$ | $T_0$ | P | |

WIDEBAND WORD FORMAT

FIG. 12

| PARAMETER | MIN | MAX |
|---|---|---|
| tAD: DELAY AA INPUT STABLE TO AD OUTPUT STABLE | | 220ns |
| tAM: DELAY AA INPUT STABLE TO MATCH OUTPUT STABLE | | 200ns |
| tDCN: C4096L LOW TO MODE HIGH | | 30ns |
| tDD: DE LOW TO AD OUTPUT STABLE | | 400ns |
| tDL: C4096L LOW TO LOAD HIGH | ∅ | 30ns |
| tf: FALL TIME C4096L | | 10ns |
| tH: HOLD TIME PCM IN FROM C4096L LOW | 20ns | |
| tHL: HOLD TIME LOAD HIGH FROM C4096L LOW | ∅ | |
| tMD: MODE HIGH TO AD STABLE | | 180ns |
| tMM: MODE HIGH TO MATCH STABLE | | 180ns |
| tr: RISE TIME C4096L | | 10ns |
| tsu: SETUP TIME PCM IN BEFORE C4096L | 30ns | |
| tz: RELEASE TIME DA ACTIVE TO "OFF" (Hi-Z) | | 100ns |

DIGITAL SWITCHING SYSTEMS EMPLOYING MULTI-CHANNEL FRAME ASSOCIATION APPARATUS

BACKGROUND OF THE INVENTION

This invention relates to apparatus for providing a high bit rate or wideband switched transmission paths for a digital switching system that has fixed a bandwidth switched transmission paths. The apparatus is used to increase the bandwidth available to an individual user. The embodiment described herein is implemented in a distributed control switching system but the apparatus and concepts are applicable to any centralized switching system of the type capable of establishing independent switched paths of a fixed bandwidth. Thus while a distributed control system is described, the technique is applicable to any digital switching system with independent switched path set-up.

Essentially, a distributed control communication system has evolved providing a novel switching network architecture. In this architecture, there is no separately identifiable control or centralized computer complex, since the control for the switching network is distributed in the form of multiple processors throughout the subsystems, with such distributed processors providing the necessary processing functions for the subsystems serviced.

Thus groups of control functions for certain systems are performed by processors dedicated to those subsystems; however, other processing functions of the same subsystems which may be more efficiently performed by other processors are performed by such other processors. An example of such a system can be had by referring to U.S. Pat. No. 4,201,890 entitled MULTIPORT DIGITAL SWITCHING ELEMENT, issued on May 6, 1980 to A. J. Lawrence et al and assigned to International Telephone and Telegraph Corporation, the assignee herein. See also U.S. Pat. No. 4,201,891 entitled EXPANDABLE DIGITAL SWITCHING NETWORK assigned to the assignee herein and U.S. Pat. No. 4,201,889 entitled DISTRIBUTED CONTROL DIGITAL SWITCHING SYSTEM also assigned to the assignee herein.

In these systems a switching network architecture is provided wherein not only are multi-channel digitized PCM speech samples or data between one terminal and another carried by the network, but the same channels also contain the path selection and control signals for the distributed control, which are carried on the same transmission paths through the network. Every terminal, whether carrying data from a line or trunk or other data source, is serviced by a terminal unit which contains all the facilities and control logic to communicate with other terminals via other terminal units and to establish, maintain and terminate paths through the switching network to other terminal units. All interprocessor communication is routed through the switching network. A group switch containing switching elements providing both time and space switching is provided so that it is modularly expandable without disruption of existing connections.

In such a switching system as presently existing and as described in the above noted patents, it is recognized that there is a per channel band width which is limited as for example to 64 KB and that is not possible to establish multi-channel paths to increase the available bandwidth. This is true since the path setup mechanism does not provide for mutual frame integrity between paths between terminals on the same two clusters. Information samples which pass through different paths between the clusters experience different delays, effectively scrambling the output. This is a considerable problem in attempting to increase the bandwidth of such a distributed control switching system. Normal path setups in such a system are done as simplex, according to a hardware algorithm which minimizes real time delay along the path. As paths are setup through such a switch in the presence of other traffic; calls, data and messages on each path will be established with a different delay. Depending on such delays, the output word will be incorrectly delivered. As will be explained further, this will constitute a frame integrity problem which will cause the data as indicated above to be scrambled.

It is, therefore, an object of the present invention to provide apparatus which will enable the set up of multi-channel link paths to enable one to achieve a total bandwidth of N times 64 KB through such a switch. It is a further object to provide circuitry which will, in fact, establish and maintain integrity between such multi-path setups.

BRIEF DESCRIPTION OF THE PREFERRED EMBODIMENT

In a digital switching system of the type having a main switch, where a plurality of data lines are coupled to said main switch via an associated line unit with said main switch controlled for making connections between pairs of said data lines, where each connection between data lines may take a different path via said main switch and each path is of a given limited bandwidth and where each different path maybe associated with a different time delay, and due to such time delays, multi-path connections cannot be made to increase said limited bandwidth due to the time-skewing of data transmitted by different paths with said data transmitted in separate channels each of a given word length and where a given number of channels constitute a frame, the combination therewith of multi-channel linking paths to increase the bandwith of said system by compensating for said different time delays, comprising first means associated with each of said lines to form a wideband word format for transmission to a receiving line, with a first given number of bits of said word indicative of data to be transmitted and with a second number of bits indicative of a tagging number manifesting a frame number for each of said word, second means for indexing said tagging number contained in said second number of bits during each frame, decoder means located at each line and operative when said line is receiving data to decode said second given number of bits to provide a frame number for said word, memory means coupled to said decoder means for storing said data associated with said words according to said frame number as decoded, said memory means including logic means operative to reassemble each word according to said frame number being the same, whereby common data can be transmitted over N given paths of said system according to said tagging number to allow a plurality of words with the same tagging signal to be reassembled at said lines receiving said data and independent of the delay of N given paths to thereby provide an increase in bandwidth of N times said limited bandwidth, where N is a positive integer.

DETAILED DESCRIPTION OF THE INVENTION

Before proceeding with a detailed description of the invention and as indicated above, it is specified that the distributed control switching system or network which this invention is pertinent to is of the type which is fully described in U.S. Pat. No. 4,201,890 entitled MULTIPORT DIGITAL SWITCHING ELEMENT by A. J. Lawrence et al, issued on May 6, 1980 and other patents indicated above. It is understood that this invention is not limited to the distributed control switching system as indicated above.

In any event, in order to gain a brief understanding of that switching system and in order to obtain an understanding of the aforementioned problem, a brief description of the system is believed to be warranted.

Figure 1:
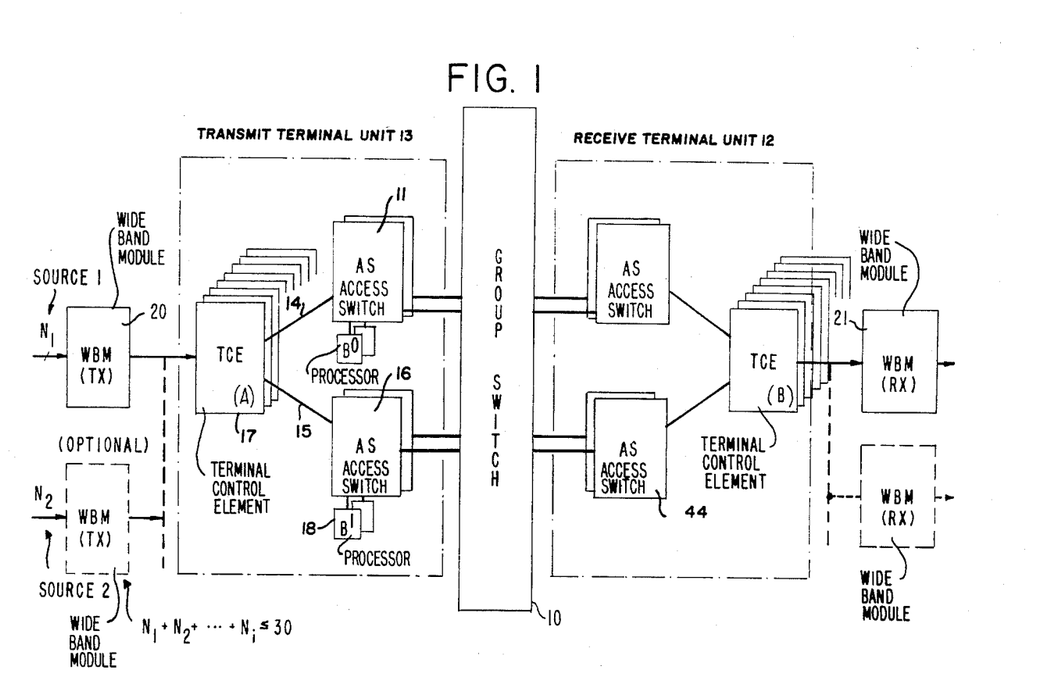
FIG. 1 is simple block diagram depicting a distributed control switching network for use in this invention.

Referring to FIG. 1, there is shown a simple block diagram of a distributed control switching system comprising a group switch 10 through which a plurality of connections between terminal units are switched to provide transmission paths for coupling data between terminals serviced by the terminal unit.

A terminal subunit is a subsystem for servicing a group of terminals which terminate on one access switch pair.

Each terminal unit contains a plurality of access switches as switch 11 which, for example, may be 4 access switches for each terminal unit and through which data from the terminals is coupled to and from the group switch 10. For sake of simplicity, there is shown a receive terminal unit 12 and a transmit terminal 13. Each terminal unit has the capability of interfacing, for example, 1920 subscriber line terminals or 480 trunks. A terminal subunit consists of one access switch pair as 11 and 16, for example, up to 8 TCEs, as 17 for example, optional processing elements, as B1 for example, and terminal equipment, 20 or 21 for example have multiplexed thereon 30 bidirectional subscriber lines which are coupled to the terminal units. Each terminal unit such as terminal unit 12 is coupled to the group switch 10 by a plurality of multiplexed transmission links. Each transmission link contains two unidirectional transmission paths. Each TCE (A) and (B) is coupled to two access switches by two such transmission links which are again shown in the patent.

As indicated, each transmission link which couples an access switch AS is bidirectional in that it includes a pair of unidirectional transmission paths where each path is dedicated to one direction of data flow. Each unidirectional transmission path carries 32 channels of digital information multiplexed (TDM) in a bit serial format. Each frame of TDM format is comprised of the 32 channels with each channel having 16 bits of information and a bit transmission rate of 4.096 Mb/S. The transmission rate is clocked throughout the system and hence the system may be characterized as rate synchronous. The system is also phase asynchronous so that there is no required phase relationship as to which data bits in a frame are simultaneously received by different switching elements or by the different ports in a single switching element. This rate synchronous and phase asynchronous switching system is implemented in the group switch and in the access switches such as switch 11 by a plurality of multiport switching elements.

These elements are also described in detail in the above noted patent. The multiport switching element is operative as a 32 channel time switch and a 16 port space switch. The digital speech samples may comprise up to 14 bits of the 16 bit channel word with the two remaining bits used as protocol bits (to identify the data type in the other 14 bits of channel). Thus, the 16 port switching element which is employed in this type of switchboard can be used to switch, for example 14 bit linear PCM samples, 13 bit linear PCM samples, 8 bit PCM samples or 8 bit data bytes.

Thus, two groups of processors are included within each terminal subunit. For example, in each TCE such as TCE (A), there is a processor each is dedicated to a separate group of terminals called a terminal cluster. This cluster terminal interface is coupled by a pair of bidirectional links such as 14 and 15 for TCE (A) to each of two access switches as 11 and 16. The access switches each provide access for TCE (A) to one pair of a second group of Auxilliary Control Element (ACE) processors such as the ACE processors $B_0$ and $B_1$ in the transmit terminal unit 13. The TCE and ACE processors as explained in the patent, are dedicated to different groups of processing functions. The format, as indicated, of the entire switching system is depicted in the above noted patent. In this system 512 serial bits constitute a frame which is divided into 32 channels of 16 bits each. Data transmitted serially from the switches is both rate and phase synchronous as the transmit control logic and the equivalent transmit control logic for the other ports of the switching elements all transmit at the same 4.096 Mb/S clock rate and at any instant are transmitting the same bit position of a frame.

On the other hand reception of bit serial data in the received terminal unit 12 is rate synchronous only as there is no necessary relationship with respect to one bit in a frame that any two ports may be receiving at any instant. Thus, reception is phase asynchronous. The transmit terminal unit 13 and the received terminal unit 12 each include a control logic portion and a random access memory which is described in U.S. Pat. No. 4,201,890.

Also shown coupled to TCE (A) and TCE (B) are two wide band modules WBM units 20 and 21 where wide band module unit 20 is designated as the transmit unit ($T_x$) and wide band unit 21 designated as the receive unit ($R_x$) as will be explained. Each WBM is employed to provide wide band operation according to this invention. In order to obtain a bandwidth improvement, data is transmitted via the TCEs associated with each terminal unit from a plurality of the wide band modules so that data from each source can be set up in multi-channel link paths which affords a total bandwidth improvement for each link of N times 64 KB. The data path from each source may have a bandwidth of $N_a$ times 64 Kb/S so long as the sum of all $N_a$ totals less than or equal to 30. Thus, theoretically, in using this system, one can obtain an effective bandwidth of up to 30 times 64 KB or a bandwidth of 1920 KB.

Figure 2:
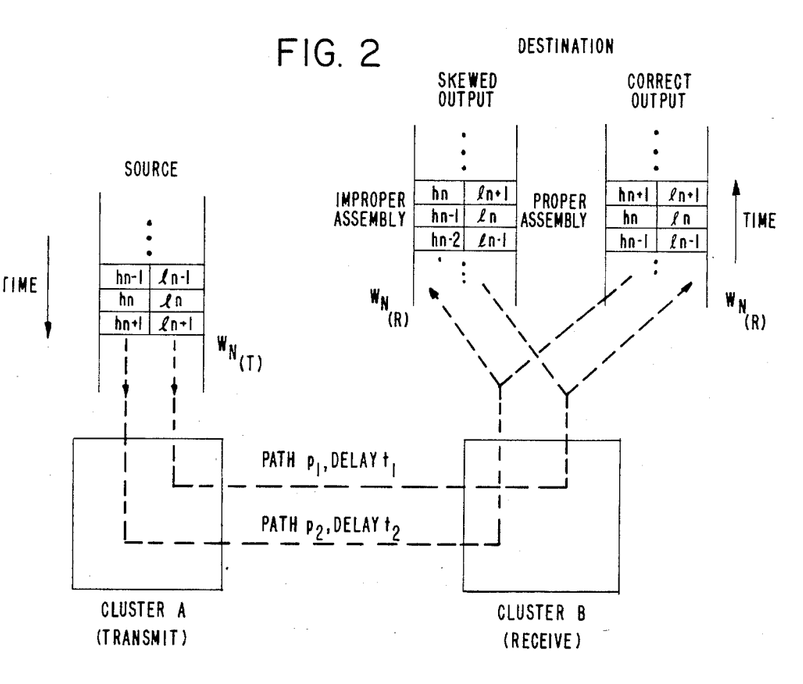
FIG. 2 is a simplified diagram necessary to explain the frame integrity problem in regard to switching systems as shown in FIG. 1.

Referring to FIG. 2, there is shown a diagram helpful to explain the frame integrity problem in such a switching system.

In FIG. 2, cluster A represents a terminal cluster associated with the transmit terminal unit 13, while cluster B represent a terminal cluster associated with the terminal unit 12. As indicated, normal path setups in the switchboard are done as simplex according to an algorithm which minimizes real time delay along the paths. As paths are set up through the switch in the presence of other logic, each path will be established with a different delay.

As shown in FIG. 2, assume that 16 bit words Wn are to be transferred between clusters A and B at an 8 kiloword rate (128 KB). A path P1 with delay T1 is established between A and B to transform the low byte and a path P2 with delay T2 to transfer the high byte. Since A and B are mutually asynchronous, as indicated above, the transfer time of the received reassembled word can be any time. Suppose the transfer time is very shortly after the receipt of the newest low byte from P1, then provided that the delay T2 of the high byte is less than that of the low byte, a properly reassembled word is delivered to the terminal and is shown as correct output in FIG. 2 where the bits of the high bits are in synchronism or aligned with the bits of the low byte. If T2 is greater than T1, the output word is incorrectly delivered as the current low byte and the proceeding words high byte. This is the frame integrity problem associated with the system. This frame integrity problem is designated on FIG. 2 as skewed output. The solution which will be described makes use of the spare bandwidth of such a switch.

As indicated, the actual data transfer path in the system is 14 bits wide which is 13 bits plus the parity bit. In regard to this the wide band operation to be described utilizes eight data bits with additional bits in each word containing information to "tag" each signal transferred. To solve the frame integrity problem, a common frame counter is put in the unused bit positions of the samples in each of the paths Pi as paths P1 and P2 in FIG. 2.

At the receive end, the circuitry to be described deskews the received samples to properly reassemble the output. The length of the frame counter to be employed must be long enough to provide for resolving the worst possible skew in the switching network described in U.S. Pat. No. 4,201,890. The longest possible delay is nearly nine frames and the shortest delay is less than one frame. Since it is practically impossible to achieve a nine frame delay and since all path setups use the minimum time delay algorithm, the worst case skew is fewer than eight frames.

Figure 3:
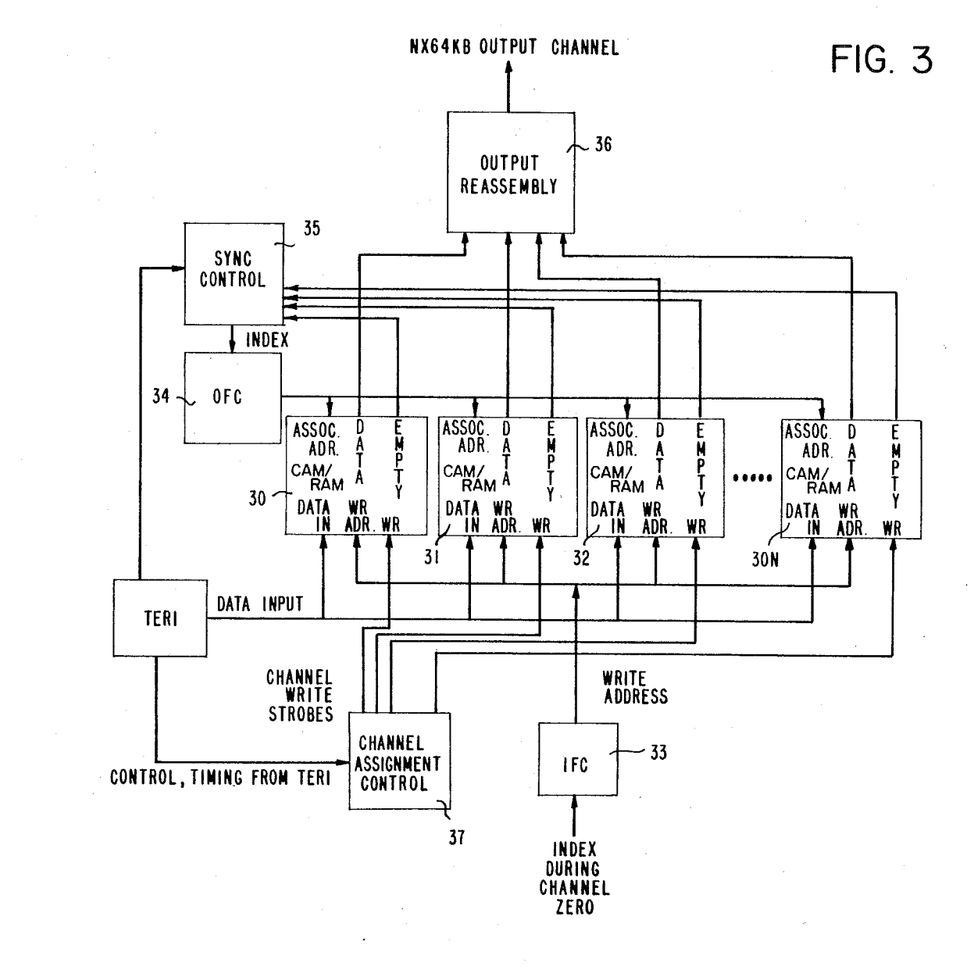
FIG. 3 is a simplified block diagram depicting apparatus for maintaining frame integrity during multi-channel wide band operation.

Referring to FIG. 3, the approach to solving the problem is depicted.

As shown in FIG. 3, there is a plurality of content addressable memories CAM with an associated RAM or CAM/RAM (C/R). There is one C/R for each channel to be joined as CAM/RAM 30, 31, 32 and 30N. The width of each C/R is twelve bits, eight for data, the RAM section, and four bits for the frame counter, the CAM section. The length of the C/R as 30 to 30N is eight words which is the maximum skew. Each C/R is associated, on a programmable basis, with one receive channel from the terminal interface of the switching system (TERI). All C/R write operations are done at an address provided by an incoming frame counter 33 (IFC). An outgoing frame counter 34 (OFC) is indexed following each channel zero 31 from the TERI. This is safe and reliable since no write operations are ever done during channel zero. Thus, the received channel words are allloaded into a C/R eight frame rotating pattern. Each C/R is a well known component and is sometimes referrred to as an associative memory. In such a memory every word written is entered at the tope and the word that has been unused the longest is at the bottom disappearing permanently when the memory overflows. Structurally, an associative memory resembles an ordinary read/write memory with the addition of a comparator for each bit. A set of inputs sometimes called a descriptor goes to all the comparators which match the inputs against the stored words.

Essentially, the operation and formats of CAM are well known and, see for example, a text entitled ELECTRONIC COMPUTER MEMORY TECHNOLOGY, edited by Wallace B. Riley and published by McGraw Hill, Inc., 1972. Such memories are described in Chapter 9, page 209, entitled "Special Memories".

As will be explained in this system, an NX64Kb channel path is established between a WBM(TX) and a WBM(RX) by setting up N64kb paths between the TX and RX. One or more WBM(TX) and WBM (RX) can be equipped per TCE.

Referring again to FIG. 3, the readout and synchroniztion mechanism with the above in mind is now quite economical. The four bit output frame counter 34 provides the associative addresses for all C/R 30 to 30N, and as seen, the output of OFC 34 is directed to the associative address input of C/R 30 to 30N. When given an associative address which is a frame number, each C/R will respond with either the eight bit data word for that frame number or provide an Empty signal. Thus, the Empty signals from each C/R are directed to a synchronization control circuit 35 which receives a control timing signal from TERI. The Empty signal implies that no word for that frame number is in C/R. At initialization, that is when the system is out of synchronization, the OFC 34 is indexed by the synchronous control 35 and all C/R s are reinterrogated to see if they contain frame one information. If some C/R does not contain a frame one sample, the OFC is indexed and all C/Rs are reinterrogated. This proceeds at a fast rate until at some OFC reading, all C/Rs indicate not Empty.

The OFC search indexing is stopped at this point. The bytes in each C/R for the frame count, as indicated by the OFC 34, are assembled into an output word. This is the data output from each C/R where the data from each C/R is assembled in the output register 36 designated as output reassembly. After this, the OFC 34 is indexed following the end of Channel 31 from the TERI to fetch the next output word. So long as all the C/Rs indicate not Empty on each output word fetch frame integrity is assured. Occurence, or more likely persistance, of an Empty indication in some C/R 30 to 30N indicates loss of frame integrity and will cause a resynchronization sequence. The C/R as will be further explained can be controlled to insure that the contents of the OFC 34 are the lowest number frame which is currently in all C/Rs. Each C/R has its data input received from TERI which is the terminal interface and the data is applied to each C/R via the data input. The TERI provides a channel assignment control via register 37 which writes into each C/R the proper data according to the channel write strobes.

The incoming frame counter 33 as indicated generates the cyclic write addresses for each C/R and the data which is entered at each write address is from the TERI. Essentially, the apparatus and method of performing wideband switching in a distributed control switching system is to first partition an incoming signal into blocks to be sent at an 8 Khz frame rate (unless it is already framed), then into a number of eight-bit bytes. In the system each of the N bytes which corresponds to the number of multichannel link paths setup associated with frame q is then tagged with a four bit number q where q is indexed every frame, modulo-16. This tag number, as will be explained, is inserted into spare bit positions 4, 3, 2 and 1 of the sixteen bit word transmitted through the switch. Each byte is then passed through an independently established path through the switch. Since each path will transfer one byte per frame, N simultaneous paths will transfer N bytes/frame or N times 64 KB. The timing skews introduced by the differential path delays are resolved at the destination location by circuitry as shown in FIG. 3.

The Circuitry automatically associates the N bytes having the same frame number to produce the wide band transmission path.

Figure 4:
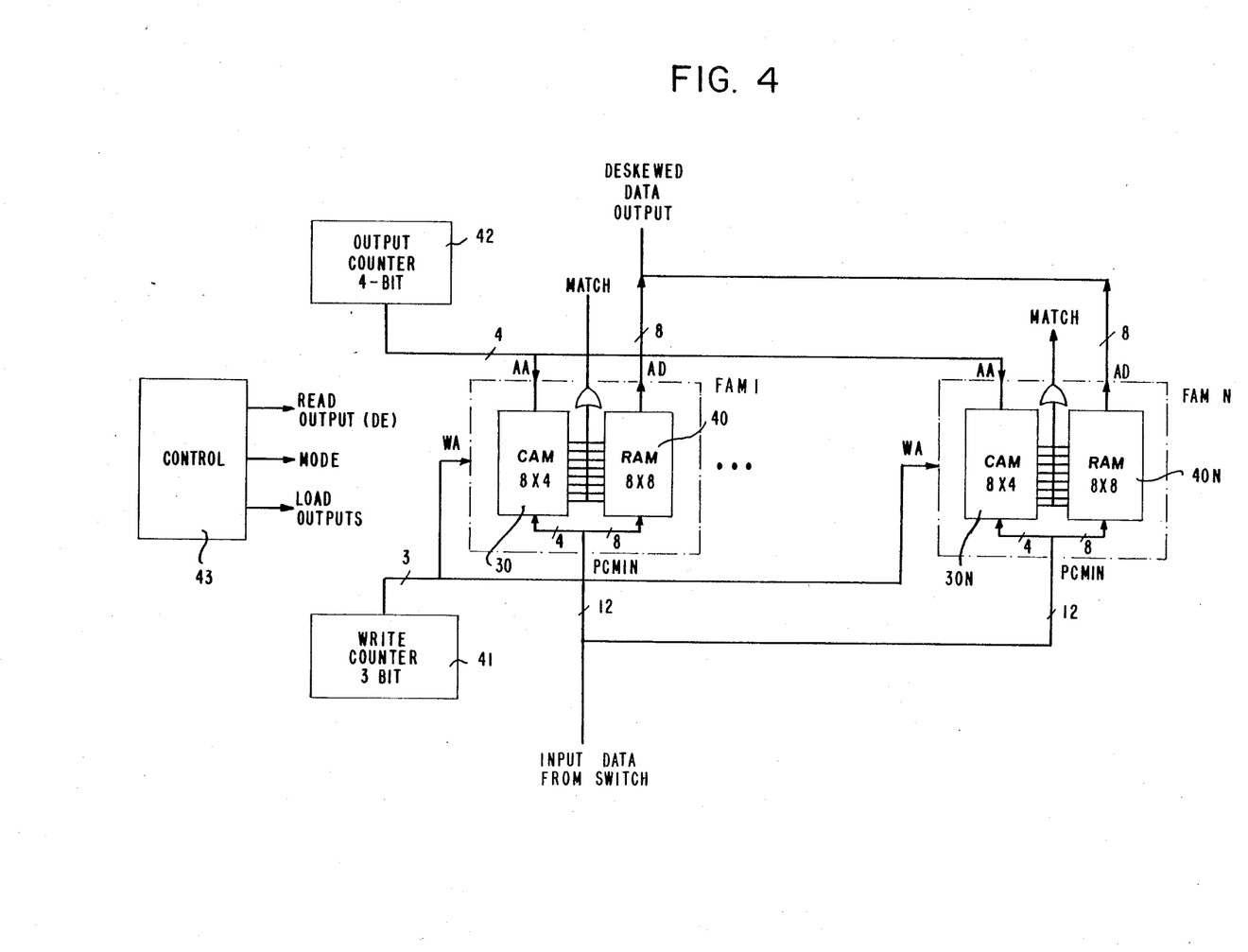
FIG. 4 is a schematic diagram showing the multi-frame association circuits in greater detail.

Referring to FIG. 4, there is shown a more detailed block diagram of the multi-channel frame association circuitry. As indicated in FIG. 4, each CAM as 30A to 30N is associated with a RAM as RAM 40 for CAM 30A and RAM 40N for CAM 30N. Each RAM and CAM corresponds to one channel, and the combination designated as a frame association memory or FAM as FAM 1 to FAM N. It is noted that up to 30 FAMs may be paralleled. The circuit depicted in FIG. 4 operates as follows.

As each of the N associated samples is received, which is designated as input data from the switch, it is written into one of the N FAMS. Each memory is eight words deep and twelve bits wide which is eight bits of RAM and four bits of CAM. The RAM and CAM share write addresses which are supplied by a three bit write counter 41. The CAM has a separate associative address input designated as AA which address is supplied by the output counter 42 which is a four bit counter. The CAM output, during the association mode, activates one RAM word select line. The CAM/RAM write address for all N samples received during one frame time (but with differing frame tags) is provided by the modulo-8 counter which is indexed at the start of each local frame. To read out the N samples, all associated with a particular frame q, all N FAM CAM sections are put in the associative mode with associative address q.

The CAM output lines of the location of which the information for frame q is stored activate on all FAMS, selecting the RAM contents for frame q and producing a N times 64 KB de-skewed data output. As shown in FIG. 4, the data output is designated as AD and is the de-skewed data output previously indicated. As will be explained, there is shown a control module 43 which controls the mode of operation of the FAMS and supplies the read and load outputs to the circuitry.

Figure 5:
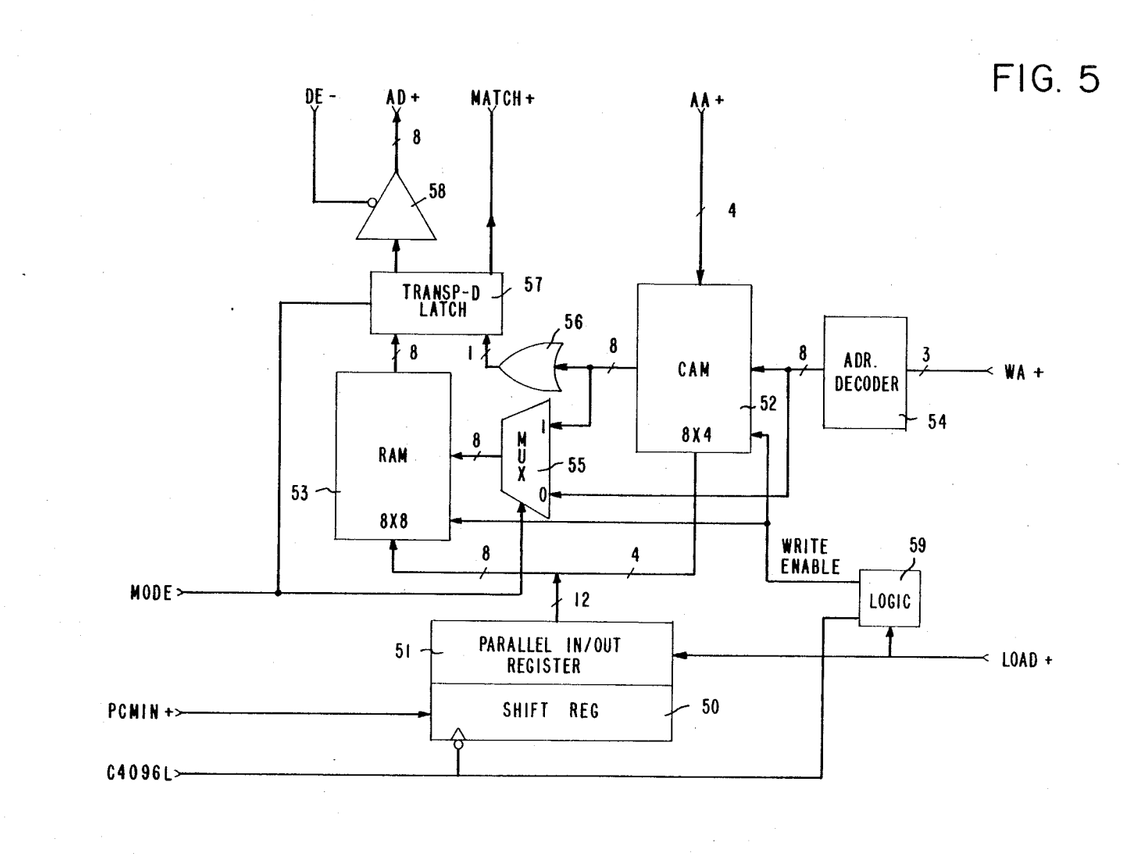
FIG. 5 is a more detailed diagram of the multi-frame apparatus.

Referring to FIG. 5, a more detailed block diagram of each FAM device is shown. The circuit of FIG. 5 has the following signals coupled to it. The signal designated PCMIN+ is a sixteen bit PCM input from the line common function which is an interface between the terminal interface and the line circuit shown and employed in conjunction with the system of U.S. Pat. No. 4,201,980. A high on this line is active and the actual input contains four bits or four data pins. The input designated as C4096L is a clock input which is common to the line common function and is at 4.096 MB/s rate. The LOAD input is a one bit line which constitutes a strobe to accept data from the line common function LCF and write into memory.

The MODE input consists of one line which when high indicates a write and when low indicates an associate. The WA input which is three bits is the write address and is high when active. The input designated AA is the associative address and is high active. The fact that the inputs are high active are indicated on FIG. 5 by a + sign. The MATCH is a one line output which is indicative of a positive association. The output AD consists of eight bits and is the retrived data output, while the input DE is one bit which is a tri-state buffer enable for AD and the negative sign indicating that it is a low active.

As seen from FIG. 5, there is shown an input register 50 which accepts twelve of sixteen bits of a word from the LCF Lout output. On proper timing of the load signal, which is coupled to a parallel in/out register 51, these twelve bits are latched and written into the CAM 52 and RAM 53 segments. For example, bits C, B, A, 9, 8, 7, 6 and 5 into RAM 53 and bits 4, 3, 2, and 1 into CAM 52 both at address WA. The address for both the CAM and RAM is furnished by an address decoder 54 which receives the write address and couples it to the CAM and the RAM via a multiplexer 55. The CAM 52 contains eight words of four bit wide static CAM. The write address is WA and the associative address is AA. The associative line outputs of the CAM 52 are fed to the RAM 53 as its outputs during the time the MODE input is high which condition activates the multiplexer 55 to receive the outputs from the CAM 52. The RAM 53 contains eight words of eight bits each static RAM. The RAM receives the address from the address decoder 54 or from the CAM outputs during the high condition of the MODE. There is shown a gate 56 which is coupled to the output of the CAM 52. This is ORgate with inputs from each of the CAM association outputs and the match goes active when any output of the CAM is active.

The output of the gate 56 is coupled to an output latch 57 which is in Transparent Mode when the MODE is active and latches on the inactive edge. In this manner, the eight RAM and one match outputs are latched. The output of the latch 57 is coupled to an octal tri state buffer 58 on eight latch outputs from RAM which is activated by DE.

The module 59 indicates a logic module which provides the write signal to the CAM 52. The logic produces a strobe as can be determined by the timing diagrams which enable both the CAM and RAM to accept data from the switching path and to store that data as coupled thereto from the parallel input/output register 51.

Figure 6:
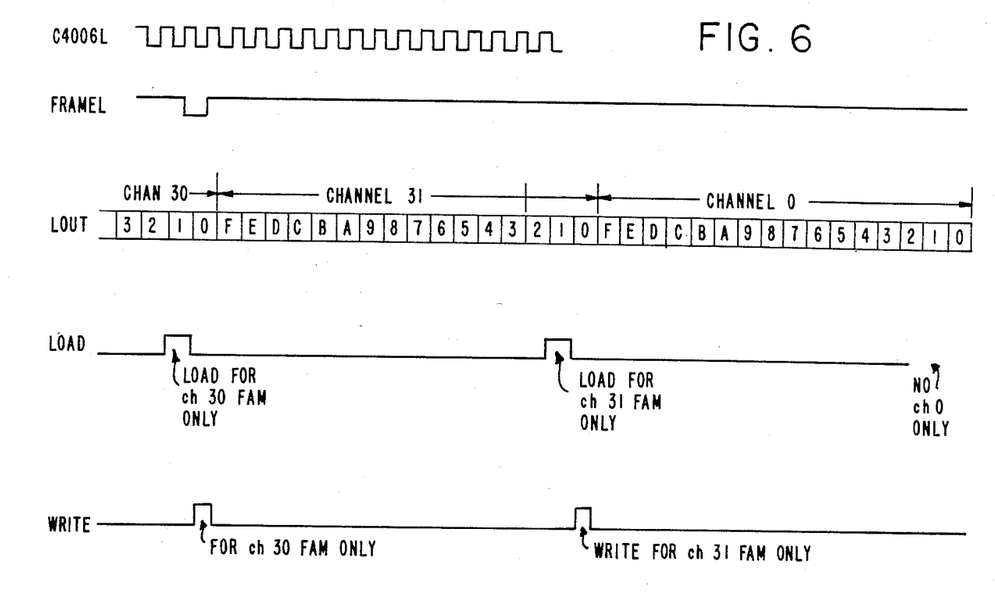
FIG. 6 s a timing diagram depicting the timing necessary for the write operation.

Referring to FIG. 6, there is shown the write operation timing format for the system. The timing for the write operation must be compatible with the switch timing and is summerized in FIG. 6 with greater detail given in FIG. 7. During the write time shown in FIG. 6, WA is stable and Mode is inactive (low). The LOAD signal causes the current output PCM word to be written into the location indexed by WA on the FAM receiving the LOAD strobe. Thus as can be seen, there is shown the LOAD signal for the channel 30 FAM and the LOAD signal for the channel 31 FAM. This timing is shown against the frame count and against the system clock.

Figure 7:
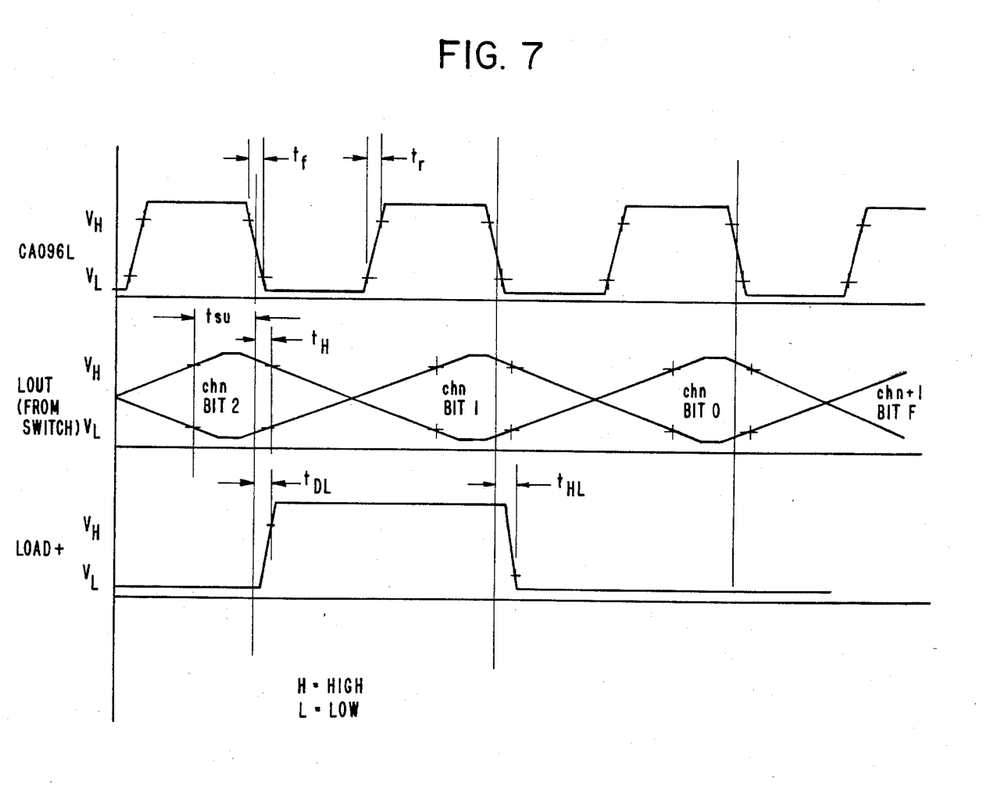
FIG. 7 is a more detailed timing diagram of the write operation.

FIG. 7 depicts the write operation timing in great detail which shows the different delays necessary to provide reliable operation for each channel bit and depicts the load signal and the PDMIN signal depicted in FIG. 5. There is also shown rise and fall times which will be listed further on for a clearer understanding. (See FIG. 12)

Figure 8:
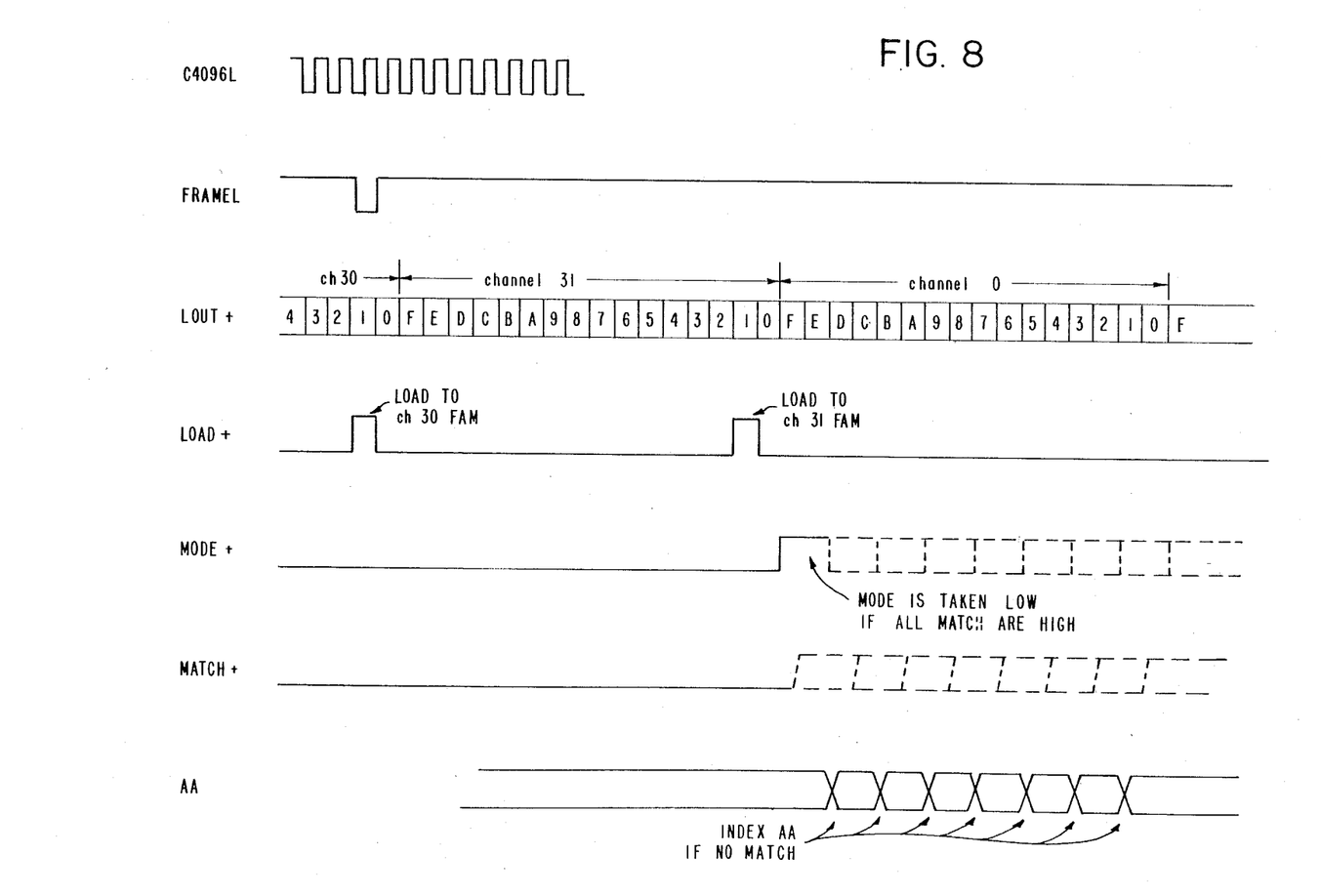
FIG. 8 is a timing diagram depicting the search operation associated with the system.

Referring to FIG. 8, there is shown the timing operations associated with the search Mode.

Figure 9:
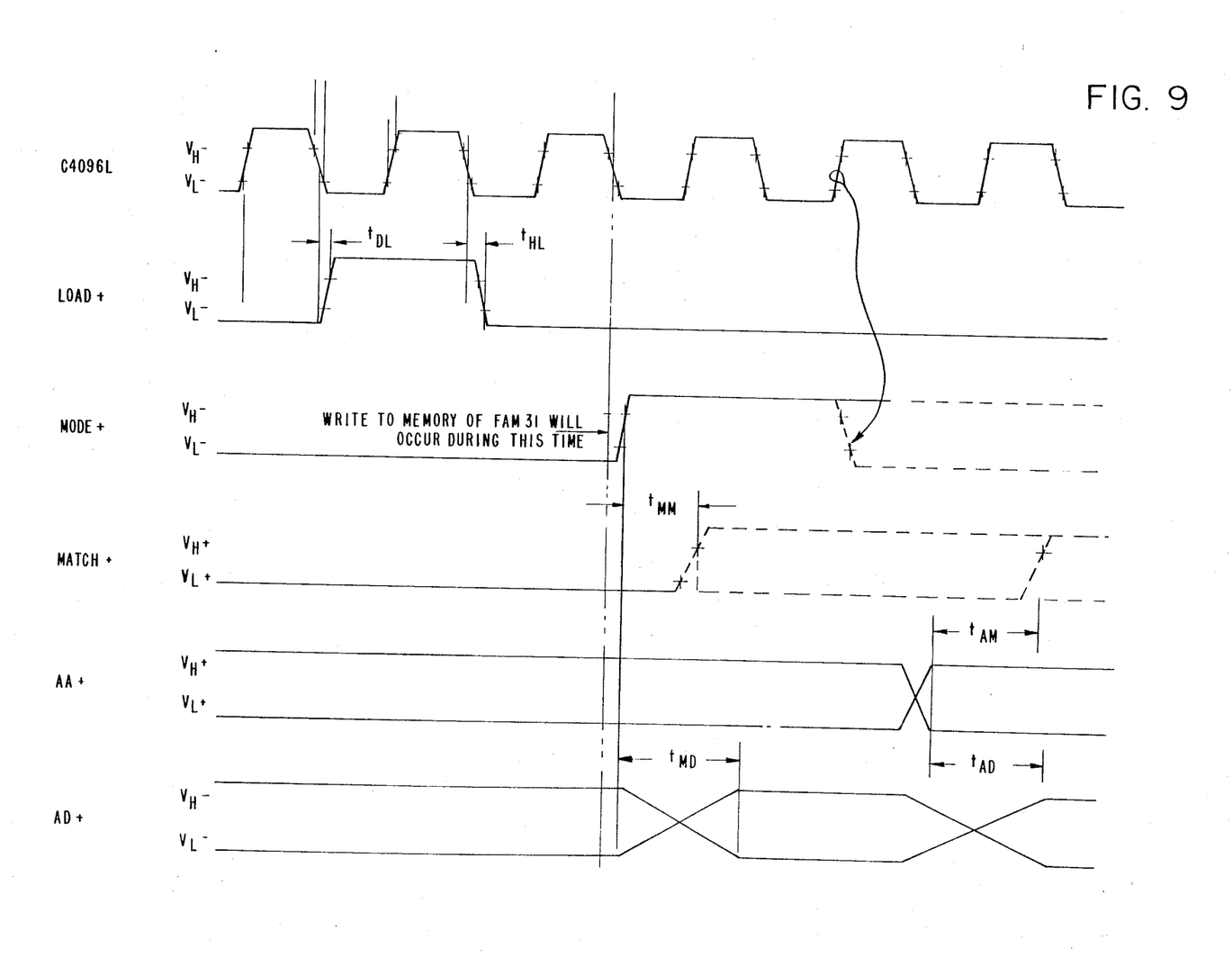
FIG. 9 is a more detailed timing diagram of the search operation.

The Search Mode is used at the time of establishment of a multi-channel path and involves determining some number p such that samples from each of the N channels of the multi-frame p are simultaneously contained in the N FAM. Since channel zero is never used for transmission, no write can occur then. This is used as the search time. FIG. 8 shows the overall search operation, while FIG. 9 shows the timing details. The operation of the circuitry in FIG. 5 basically consists of presenting some frame address p to each of the N FAMs of FIG. 4 on the AA lines, setting MODE active and observing match outputs. The match goes active if some CAM location equals p. If all N match outputs from N FAM are active for some p, this is a valid multi-frame number. If not, p is indexed and the operation continues. At the associative address p, at which all N match outputs become simultaneously active, MODE goes low latching the data and MATCH line outputs.

As shown in FIG. 8, there are up to eight associatve accesses and seven address indexes during one channel zero. There is no index following the last association, since the last address will be retried at the start of the next channel zero.

Figure 10:
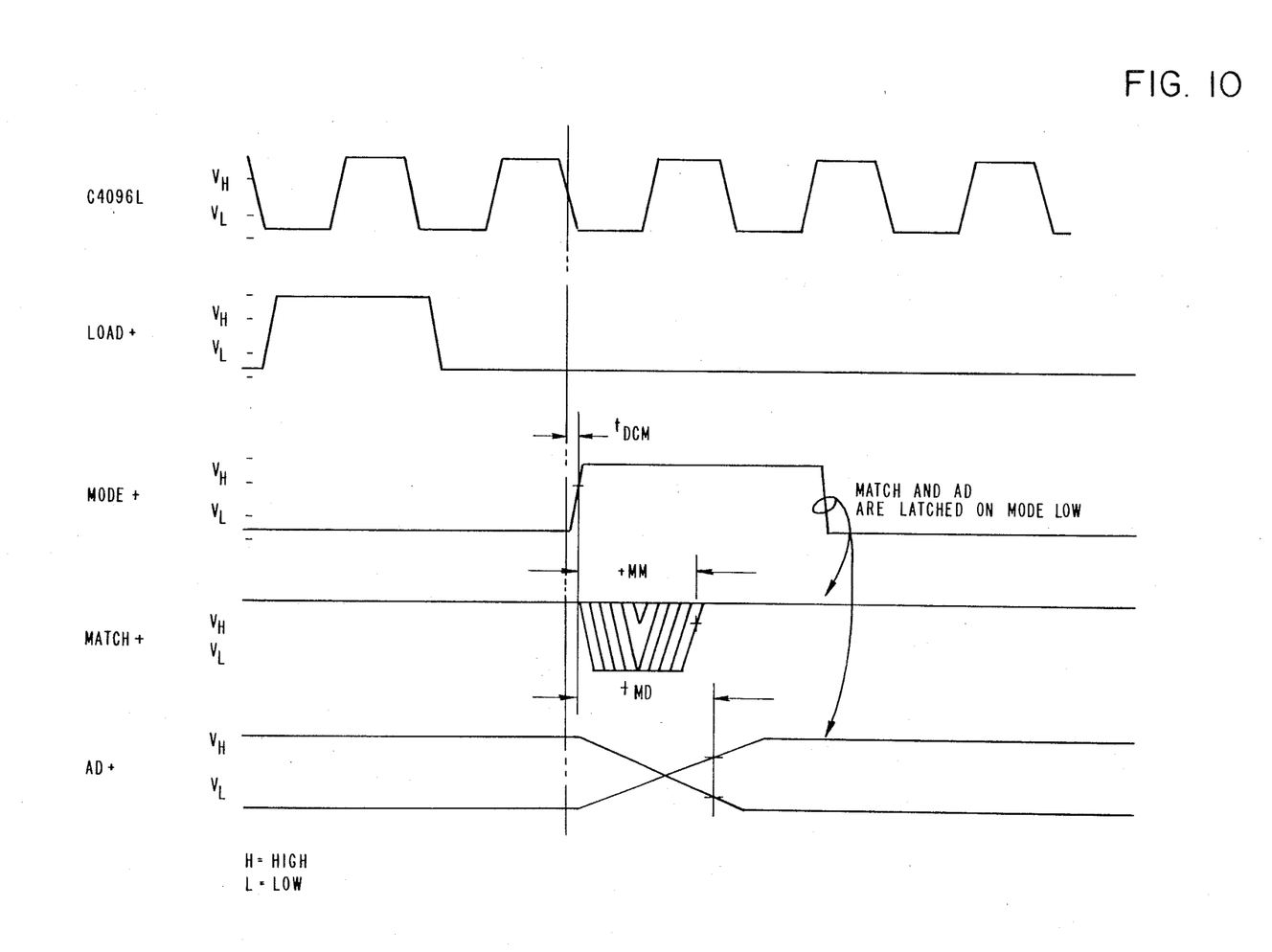
FIG. 10 is a timing diagram depicting a read operation.

Referring to FIG. 10, there is shown a normal multi-channel read operation and the timing for such operation. Following the search, one multi-channel read operation is executed per frame (local channel zero time). During this time as shown in FIG. 10, an associative address p is presented to all N AA inputs and the MODE line is activated when taken low, one clock cycle later. The data output and the state of the MATCH line are latched on MODE low as indicated in FIG. 10.

Assuming proper operation all N match lines are active and the retrieved N bytes of information constituting the receive word are latched in the FAMs. They are then read out by activating the three state output enable lines of each FAM in turn.

Figure 11:
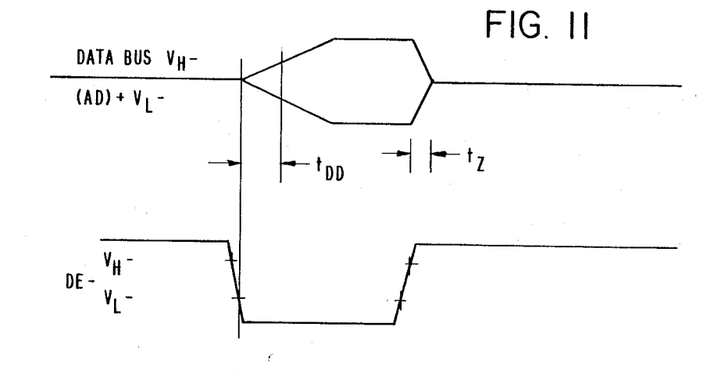
FIG. 11 is a timing diagram for the data output.

Referring to FIG. 11, there is shown the timing relationships associated with reading out the N AD bytes from the N FAM devices shown in FIG. 4 as 30 to 30N.

Figure 12:
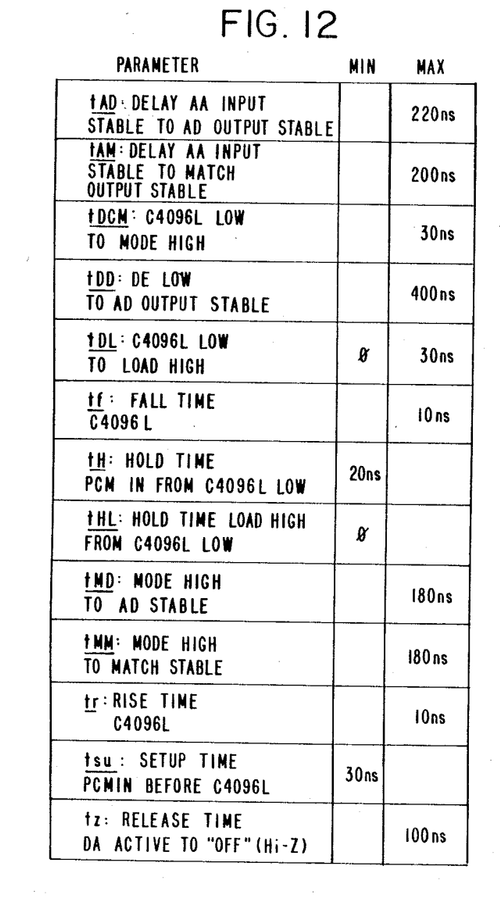
FIG. 12 is a chart showing the various delays depicted in the timing diagrams.

In FIG. 12 there is a table of timing parameters depicted in FIGS. 7, 9, 10 and 11. These timing parameters are compatible with the 4.096 MB/s clock which is also shown in all these Figures.

Figure 13:
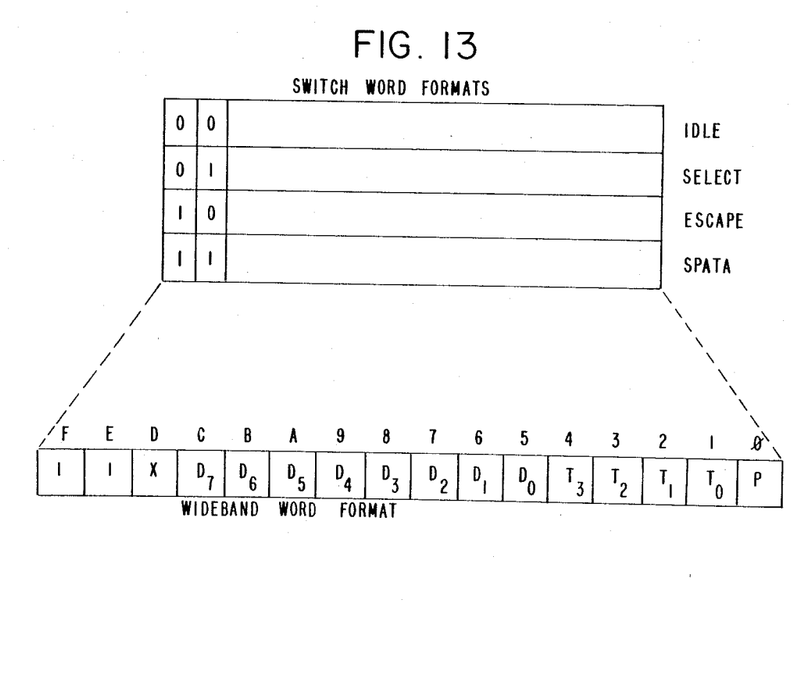
FIG. 13 is a diagram showing an example of the wide band word format.

Referring to FIG. 13, there is shown the wide band format to enable data to be transferred in separate paths to provide for wide band operation. Essentially a typical switch word format is shown in FIG. 13 with the designations Idle, Select, Escape and Spata. These word formats are clearly shown in U.S. Pat. No. 4,201,890 in FIGS. 10 and 11 and each word format consists of sixteen bits. Shown beneath the switch word formats is the wideband word format utilized in the above description.

Essentially, bits F, E, and D may be used for protocol selection. In the wide band word format, the bits F, E and D are also used for protocol selection, while bits C, B, A, 9, 8, 7, 6 and 5 are the data part of the wideband word format. While bits 4, 3, 2, and 1 are the multi-frame tagging signal which as indicated is the four bit tag used by the CAM as explained above. The bit labeled 0 is the parity bit. Hence the word format as indicated above is in complete agreement with the word format utilized in a distributed control switch. It is well known how to generate the above noted word format from the transmitting end of the switch. Essentially, as indicated, an incoming signal from a terminal or data line is partioned into blocks and then into eight bit bytes. This employs conventional circuitry with each of the bytes then tagged with the four bit number indicative of each frame. Techniques for doing this, as indicated, are well known and examples of such techniques are given in the above referenced patents.

Figure 14:
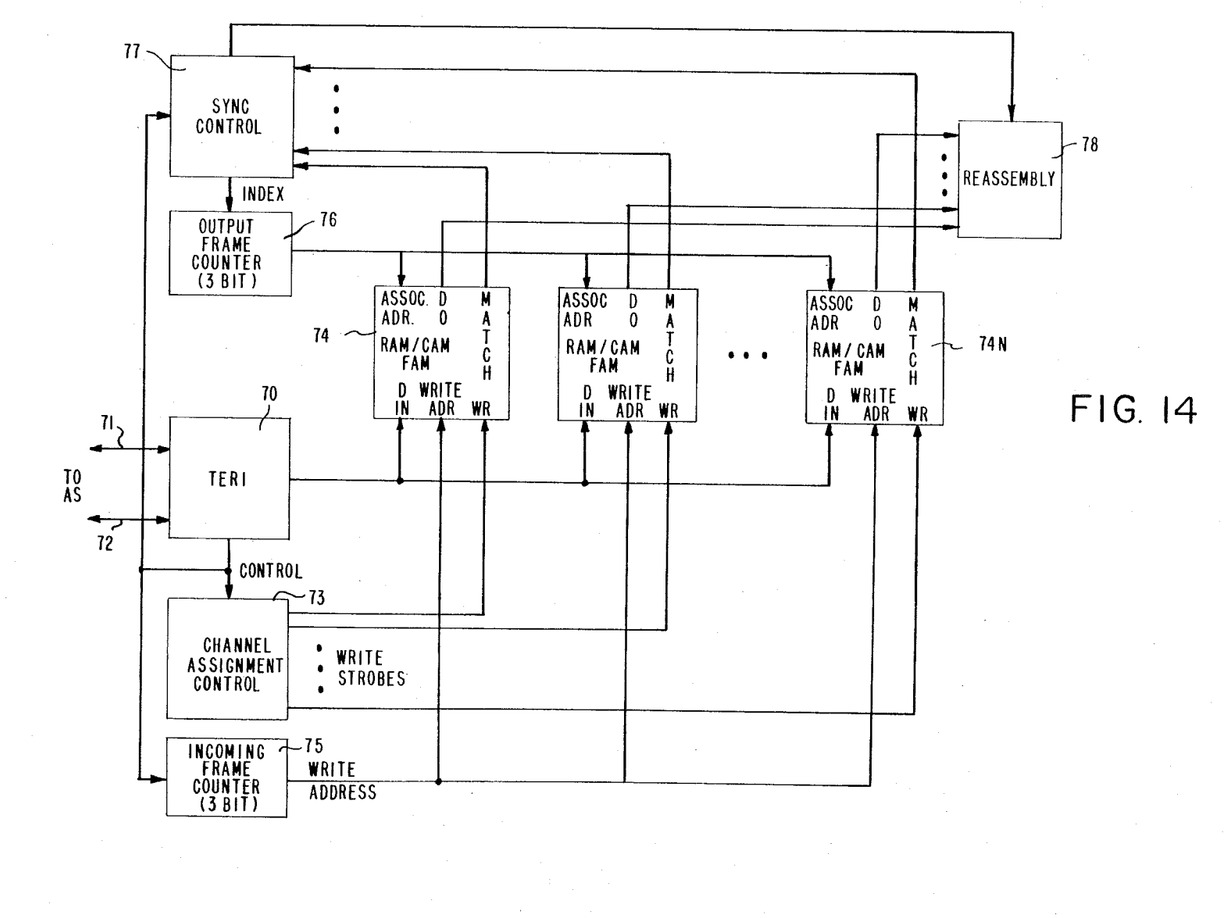
FIG. 14 is a detailed block diagram of the wide band module WBM shown in FIG. 1.

Referring to FIG. 14, there is shown a clearer presentation of the circuitry depicted in FIGS. 3 and 4. The module 70 designated as TERI is the terminal interface from the switchboard which essentially consists of two bidirectional transmission paths 71 and 72 which are coupled to the access switch. The terminal interface provides the control timing from the switch to the channel assignment control module 73. The channel assignment control 73 produces the write strobes for the FAMs 74 to 74N which, of course, contain the RAM and CAM sections. The data is also derived from module 70 and is coupled to the D input of the FAMs 74 to 74N. The write address is obtained from the incoming frame counter 75 which, as indicated above, is a three bit counter and which writes the addresses for each frame into the FAMs. The output frame counter 76 which is indexed by the synchronous control 77 is a three bit counter which writes the associative addresses into the FAMs with the match output of the FAMs directed to the inputs of the sychronous control 77 for indexing the same.

The data outputs $D_0$ from the FAMS are coupled to the register 78 which may be a last in/first out register to properly sequence the data so that it is not skewed.

Figure 15A:
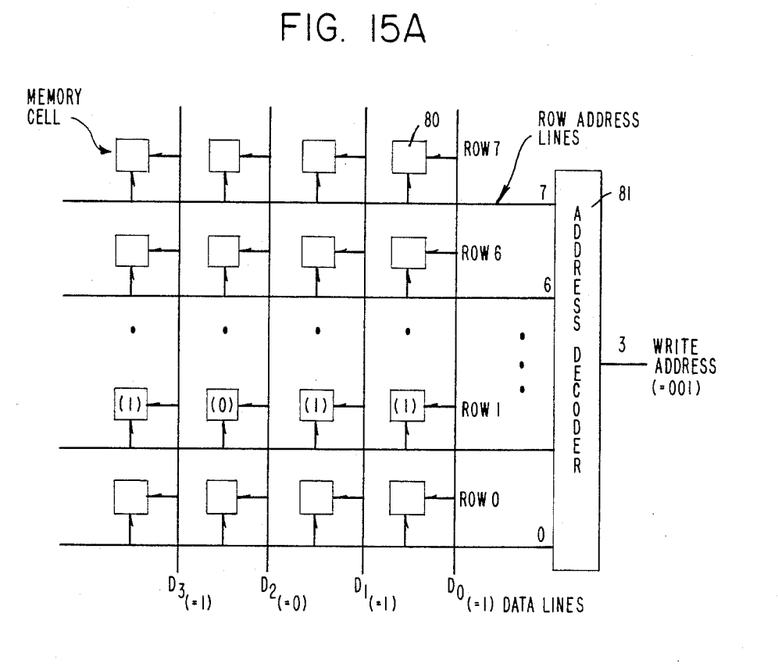
FIG. 15A is a block diagram showing a write operation of a content addressable memory employed in this invention.

Referring to FIG. 15A, there is shown a typical block diagram of a CAM during a write operation. Essentially, the CAM consists of eight rows each and four column where each row and coloumn contains a memory cell as 80, an address decoder 87 receives the write address and accesses the proper row address lines. During the write operation, the data lines $D_0$ to $D_3$ are written into each row with the row address line active.

Figure 15B:
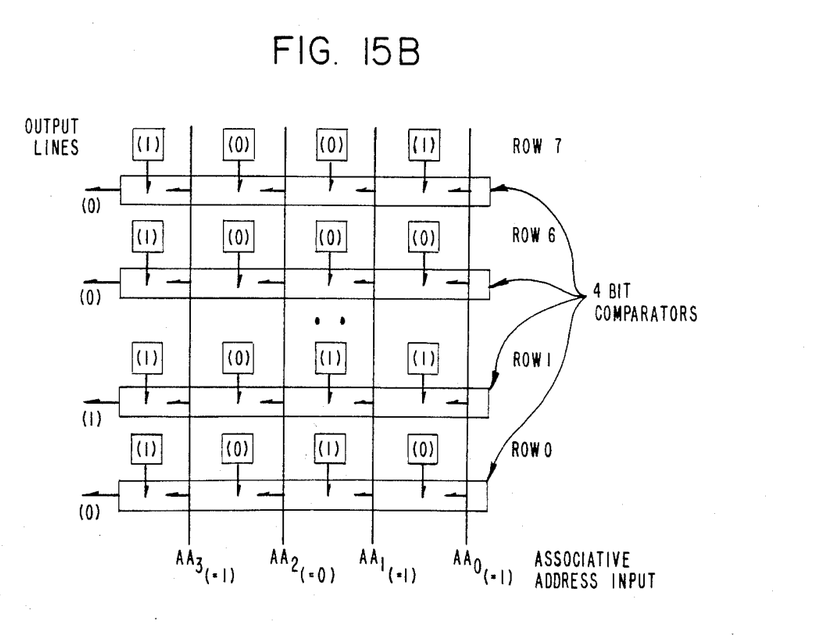
FIG. 15B is a block diagram showing the association operation of a content addressable memory.

Referring to FIG. 15B, there is shown the association operation of the CAM. Essentially, the content addressable memory or CAM contains four bit comparators in each row. During this operation, the contents of all rows is compared with the associative address input designated as $AA_0$ to $AA_3$. The output lines are high if the contents of a row match with the associative address. As indicated, this type of memory is widely employed and many examples exist in the prior art and are supplied by many manufacturers, and see for example the text indicated above.

In summation, there has been described a system which is capable of increasing the bandwidth of a distributed control switching system by setting up multi-channel link paths where N 64 KB paths are linked to produce frame integrity where N is a positive integer from 2 to 30. To establish and maintain frame integrity, a multi-frame number is added to each of the N samples of one word whereby the word contains eight data bits. The multi-frame number is indexed (modulo-16) every frame where the number is inserted in the sixteen bit word in bit positions 4 to 1. Thus N independent paths are established for the N samples. At the destination end the N samples having the same multi-frame number are retrived to reconstruct the word.

Referring back to FIG. 1, the WBMs 20 to 21 contain the multi-channel frame association circuitry. Hence as described above, the $N_1$ bytes of the word from each source as source 1 are tagged with a frame count. The switchboard sets up $N_1$ independent paths for transfer of the $N_1$ bytes setup between TCE (A) and TCE (B). The WBM at the receive end 21 uses the tag number to reconstruct the input source frame. Each WBM is one VLSI device which is programmable to associate two to thirty channels and basically has the structure indicated in FIG. 5.

I claim:

1. In a digital switching system of the type having a main switch, where a plurality of data lines are coupled to said main switch via a line unit with said switch controlled for making connections between pairs of said data lines, where each connection between data lines may take a different path via said main switch and each path is of a given limited bandwidth and where each different path may be associated with a different transit time delay and due to such time delays multi-path connections cannot be made to increase said limited bandwidth with said data transmitted in separate channels each of a given word length and where a given number of channels constitute a frame, the combination therewith of multi-channel frame association apparatus for allowing multi-channel linking paths to increase the bandwidth of said system by compensating for said different time delays, comprising:

first means associated with each of said lines to form a wideband word format for transmission through said main switch to a receiving line, with a first given number of bits of said word indicative of data to be transmitted and with a second number of bits indicative of a tagging number manifesting a frame number for each of said words, second means for indexing said tagging number contained in said second number of bits during each frame, decoder means located at each line and operative when said line is receiving data to decode said second given number of bits to provide a frame number for said word, memory means coupled to said decoder means for storing said data associated with said words according to said frame number as decoded, said memory means including logic means operative to resassemble each word according to said frame number being the same, whereby common data can be transmitted over N given paths of said system according to said tagging number to allow a plurality of words with the same tagging signal to be reassembled at said lines receiving said data and independent of the delays of said N given paths to thereby provide an increase in bandwidth of N times said limited bandwidth, where N is a positive integer.

2. The digital switching system according to claim 1, wherein said memory means includes one Contentable Addressable Memory (CAM) for each of N Paths, said CAM having a data storage section and an associative section, an output frame counter coupled to said CAMs and operative to provide an associative address for said CAMs indicative of said frame number, means coupled to said CAMs and operative during said associative address to determine if said CAMs contain data during said associative address, means responsive to all CAMs containing data for assembling the data stored in said CAM to provide said word from all N paths for said frame.

3. The digital switching system according to claim 2 where N is a positive integer between 2 to 30.

4. The digital switching system according to claim 2 wherein said data storage section receives data from said transmitting line and means for writing said data into said CAMs during each frame as detected by said decoder means.

5. The digital switching system according to claim 2 further including data detecting means coupled to said CAMs and operative to provide an output when any one of said CAMs does not contain data during said frame and means responsive to said output to reset said frame counter to start a re-synchronization sequence.

6. The digital switching system according to claim 1 wherein said given word length is 16 bits, with said wideband word format being 16 bits, with said first given number of bits being 8 and with said second given number of bits indicative of a tagging number being 4.

7. The digital switching system according to claim 2 wherein said data storage section of said CAM is capable of storing 8 bits and wherein said associate section is 4 bits.

8. The digital switching system according to claim 2, wherein said data storage section of each CAM includes a random access memory coupled to said CAM and operative to store said data bits, with said RAM coupled to said CAM and operative to provide said stored data when all of said CAMs indicate a match with said associative address.

9. The digital switching system according to claim 8, wherein said RAMs and CAMs have the same write address for storing data during each word with said RAM storing said data bits and said CAM storing said tagging number bits.

10. The digital switching system according to claim 9, wherein said logic means includes an output buffer coupled to said RAM and operative to latch said data bits when all of said CAMs indicate a match.

11. The digital switching system according to claim 1, wherein said decoder means includes a channel assignment control circuit having a control input adapted to receive a timing signal from said switching system for writing data into said memory means and an input framing counter coupled to said memory means for providing a write address for said memory means.

12. The digital switching system according to claim 1 wherein said system is a distributed control system having a main switch designated as a group switch where said data lines are coupled to said group switch via an associated line terminal unit including an access switch stage for making connections between said data lines.

13. A method for enabling a digital switching system to transmit and receive common data consisting of words wherein a given number N of said words are transmitted in a frame along a plurality of N linked paths implemented by said switching system, each path connecting a pair of terminals and having a given bandwidth and an unpredictable delay, whereby said method enables the reception of said common data from each of said paths independent of said delays to prevent data skewing, comprising the steps of:

generating a frame tagging number for each frame to be transmitted;

indexing said frame tagging number for each frame;

inserting said frame tagging numbers in given bit positions in each said word, so that each word transmitted in a frame has the same frame tagging number indicative of the frame in which it is transmitted;

establishing N independent linked paths for said N words via said switching system;

receiving said N words at the receiving destination end of said paths and;

reassembling the N words having the same frame tagging number to reconstruct the common data to thereby effectively increase said given bandwidth by N times, where N is a positive integer.

14. The method according to claim 13, wherein N is a positive integer between 2 to 30.

15. The method according to claim 13, wherein said words are 16 bit words, with each word of the bit format F, E, D, C, B, A, 9, 8, 7, 6, 5, 4, 3, 2, 1, 0.

16. The method according to claim 15, wherein said frame tagging number is indexed every frame within a predetermined modulus.

17. The method according to claim 15, wherein said frame tagging number is located in bits 4 to 1 of each word.

18. The method according to claim 17, wherein bits C, B, A, 9, 8, 7, 6 and 5 contain the data for said word.

19. The method according to claim 18, wherein the step of receiving said N words includes storing said received in a Contentable Addressable Memory (CAM) at said destination.

20. The method according to claim 19 including the steps of placing one CAM for each of the N paths to be joined at said receiving destination.

21. Apparatus for increasing the bandwidth of a distributed control switching network, said network of the type having a group switch to which a plurality of data lines are coupled to said switch via an associated terminal unit for making connection between pairs of said data lines via said switch, where each connection between data lines may take a different path with each path of the same given bandwidth but of a different delay to thereby prevent common data transmitted along different paths to be received in proper sequence due to said different delays, with said data as transmitted in separate channels each of a given word length and where a given number of channels constitute a frame, said apparatus operative at said receiving end to synchronize said common data transmitted along N linked paths with each word transmitted containing a given number of bits indicative of a tagging signal indicative of the frame associated with each word as transmitted via said N linked paths, and including a given number of data bits comprising:

timing cointrol means coupled to said switching system to provide a clock signal indicative of the timing of said words, a plurality of memory means one for each linked path located at said receiving end and operative to store therein in a first means said data and in a second associative means said tagging signal indicative of an associative address manifesting said frame, an output frame counter oeprative to address said memory means to provide at the output a signal indicative of said associative address, means coupled to said memory means for determining a condition when all of said memory means contain data during said tagging signal to provide an output signal indicative of all of said memory means containing data, and means responsive to said output signal for reassembling said data word stored in said memory means according to said output signal.

22. The apparatus according to claim 21, wherein said memory means includes a first means being a Random Access Memory (RAM) for storing said data and a second means being a Contentable Addressable Memory (CAM) for storing said tagging signal.

23. The apparatus according to claim 21, further including an input frame counter for providing a write address to said memory means and channel assignment control logic means operative to provide a write strobe to said memory means to allow words from said switching system to be stored in said memory means.

24. The apparatus according to claim 21 further including detecting means coupled to said memory means and operative to detect the absence of data from any one of said memory means to provide an output control signal, and means coupled to said output frame counter to index the same upon reception of said control signal to cause said output frame counter to supply a start address to said memory means for re-synchronization of the same.

25. The apparatus according to claim 21, wherein said word is a 16 bit word of the bit format F, E, D, C, B, A, 9, 8, 7, 6, 5, 4, 3, 2, 1, 0, with said data contained in bits C, B, A, 9, 8, 7, 6, 5 and said tagging signal contained in bits 4, 3, 2, and 1.

26. The apparatus according to claim 25, wherein 32 words constitute a frame.

27. The apparatus according to claim 21 where N is a positive integer between 2 to 30 and said increase in bandwidth is N times said given bandwidth.

* * * * *

UNITED STATES PATENT AND TRADEMARK OFFICE
CERTIFICATE OF CORRECTION

PATENT NO. : 4,608,684

DATED : Aug. 26, 1986

INVENTOR(S) : DANIEL C. UPP

It is certified that error appears in the above-identified patent and that said Letters Patent is hereby corrected as shown below:

Claim 19, line 3; after received insert --N words--.

Signed and Sealed this

Twenty-fifth Day of November, 1986

Attest:

DONALD J. QUIGG

*Attesting Officer*          *Commissioner of Patents and Trademarks*